(12) United States Patent
McRae et al.

(10) Patent No.: US 8,887,081 B2
(45) Date of Patent: Nov. 11, 2014

(54) TOUCH DISPLAY UNLOCK MECHANISM

(75) Inventors: Matthew Blake McRae, Laguna Beach, CA (US); Scott Paul McManigal, Newport Beach, CA (US); Victor Brilon, Mountain View, CA (US)

(73) Assignee: Vizio Inc., Irvine, CA (US)

( * ) Notice: Subject to any disclaimer, the term of this patent is extended or adjusted under 35 U.S.C. 154(b) by 13 days.

(21) Appl. No.: 13/244,325

(22) Filed: Sep. 24, 2011

(65) Prior Publication Data

US 2013/0080960 A1    Mar. 28, 2013

(51) Int. Cl.
*G06F 3/048* (2013.01)
*G06F 3/033* (2013.01)
*G06F 3/0488* (2013.01)
*G06F 21/36* (2013.01)

(52) U.S. Cl.
CPC ............ *G06F 3/048* (2013.01); *G06F 3/04883* (2013.01); *G06F 21/36* (2013.01)
USPC ........... 715/772; 715/771; 715/764; 715/863; 715/784

(58) Field of Classification Search
None
See application file for complete search history.

(56) References Cited

U.S. PATENT DOCUMENTS

| | | | |
|---|---|---|---|
| 2009/0094562 A1* | 4/2009 | Jeong et al. | 715/863 |
| 2010/0248689 A1* | 9/2010 | Teng et al. | 455/411 |
| 2010/0306693 A1* | 12/2010 | Brinda | 715/784 |
| 2011/0271181 A1* | 11/2011 | Tsai et al. | 715/702 |
| 2012/0009896 A1* | 1/2012 | Bandyopadhyay et al. | 455/411 |
| 2012/0133484 A1* | 5/2012 | Griffin | 340/5.54 |
| 2012/0174042 A1* | 7/2012 | Chang | 715/863 |
| 2012/0223959 A1* | 9/2012 | Lengeling | 345/619 |

\* cited by examiner

*Primary Examiner* — Ryan Pitaro
*Assistant Examiner* — Mahelet Shiberou
(74) *Attorney, Agent, or Firm* — Law Office of Scott C. Harris, Inc.

(57) ABSTRACT

An unlock system for a computer such as a tablet. The screen of the tablet can be automatically locked after time were based on an action. Once locked, the contents of this screen are blocked by the locking screen which can be a blank screen or screen which shows status parts. Areas on the locking screen are defined, within which the user can touch the locking screen and drag it to the opposite side. During the time of dragging, the items underneath, showing the actual content of the screen, are revealed. In one embodiment, the unlock action may automatically continue after a certain point on the screen has been reached.

30 Claims, 7 Drawing Sheets

User dragging unlock bar from left to right

Figure 1: Display screen with objects displayed

Figure 2: Display screen showing unlock regions and directional indicators

Figure 3: Display screen showing unlock bar and direction indicator when user touches screen edge Figure 4: User dragging unlock bar from right to left Figure 5: User dragging unlock bar from left to right Figure 6: Display screen prior to unlock being performed Figure 7: Display screen during unlock showing pre unlock objects

TOUCH DISPLAY UNLOCK MECHANISM

BACKGROUND

Many mechanisms have been used for unlocking a computing device which has no physical keyboard. For devices which blank the display screen when they go idle, reliably unlocking the display screen can be a challenge. Some devices detect when they have been moved or when someone touches the display screen. Simple movement of the computing device does not mean that the person moving the device desires it to become active.

Some devices will display a pattern of objects on the screen then permit the user to touch a starting object then, using their finger, draw a line from a starting object to several other objects. The sequence in which specific objects are then touched by the user's finger constitute a predefined pattern. If the pattern entered by the user matches the predetermined pattern the device will be unlocked for use.

Other devices display a series of objects or graphic images and the user touches some plurality of objects in a predetermined sequence. This scenario operates much the same as the previously described line pattern unlock scenario.

Devices utilizing these types of unlock mechanisms require the use to memorize the pattern sequence for unlocking the display.

SUMMARY

The present invention is an unlock method and apparatus for touch display controlled computing devices such as tablet PCs, cell phones, and PDAs. The present invention is intended to overcome the limitations of existing unlock methods for computing devices with touch sensitive displays.

Embodiments describe partitioning or dividing the touch sensitive display into zones; where the zones are adjacent to a vertical edge of the display and extending toward the center of the display for some predetermined distance.

In an embodiment, during the unlocked state, the device, when touched, displays a bar extended from the top to the bottom of the display. As the user drags the unlock bar opposite edge of the display screen, the movement of the bar reveals the image of the display prior to the display screen being locked. At some point when the unlock bar has been dragged a predetermined distance across the display screen, the balance of the display screen is unlocked and displayed.

BRIEF DESCRIPTION OF THE DRAWINGS in the drawings.

DETAILED DESCRIPTION

Figure 1:
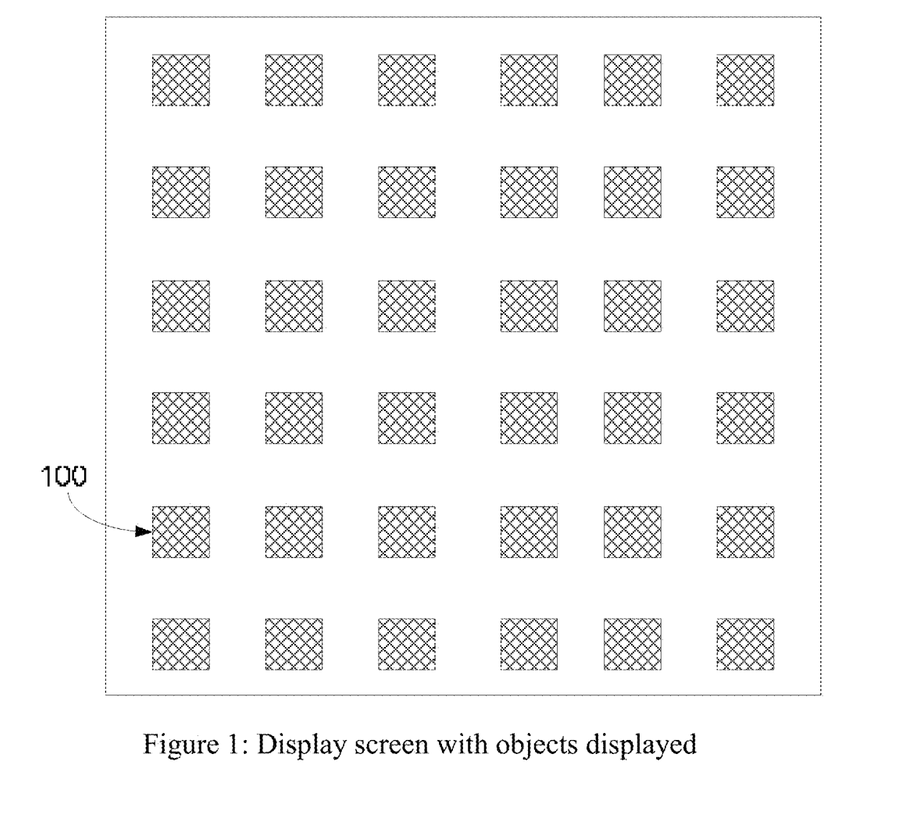
FIG. 1 is a depiction of a display screen with objects being displayed, where at some point in time the display screen is locked by the user or by the system because of inactivity.

FIG. 1 is a depiction of a display screen with objects 100 being displayed. Each of the objects 100 may be an icon representing the program, for example, or some basic operation. According to an embodiment, the FIG. 1 display shows these items, and where eventually, the display screen becomes locked. The display screen can be manually locked by user, or can be automatically locked either after a period of time or after some kind of locking operations such as closing the cover.

Figure 2:
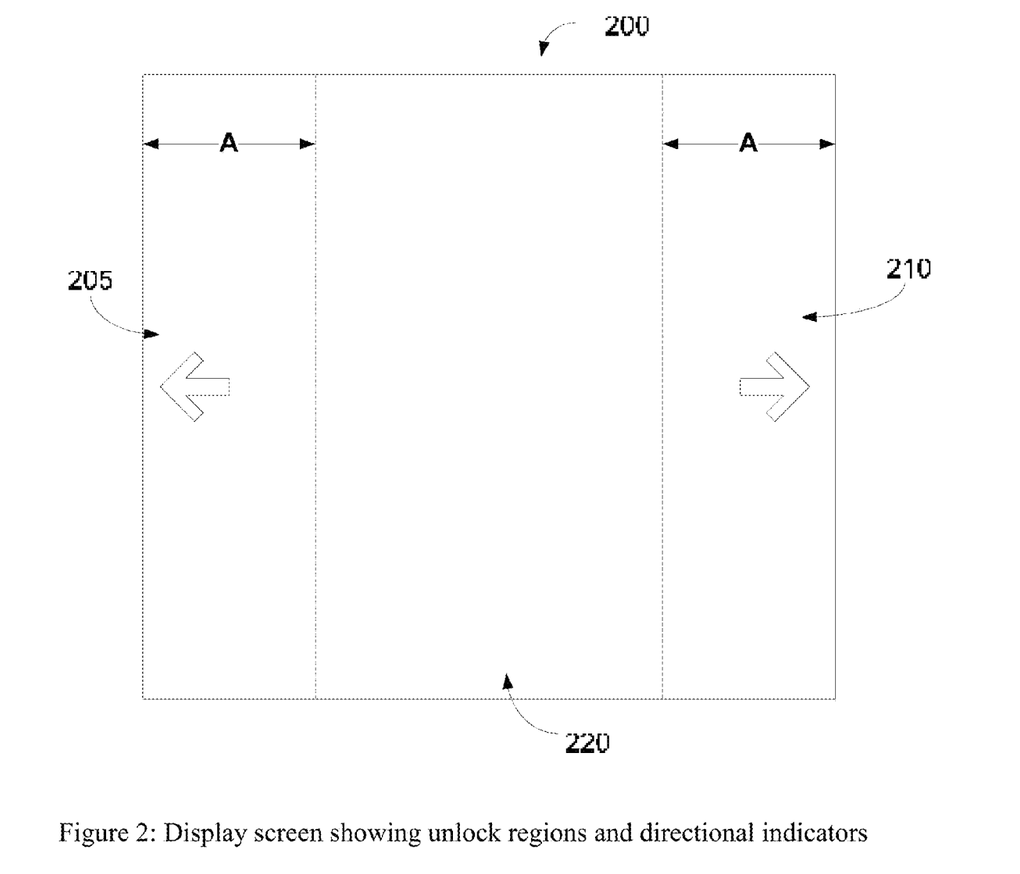
FIG. 2 is a depiction of the display screen showing directional indicators which in this depiction are left and right arrows. The space between the vertical dotted lines and the closest parallel edge of the display screen form the zone in which, if touched by the user, will cause the display unlock method to be invoked by the system. The "A" indicates the extent or size of the unlock zone.
Figure 3:
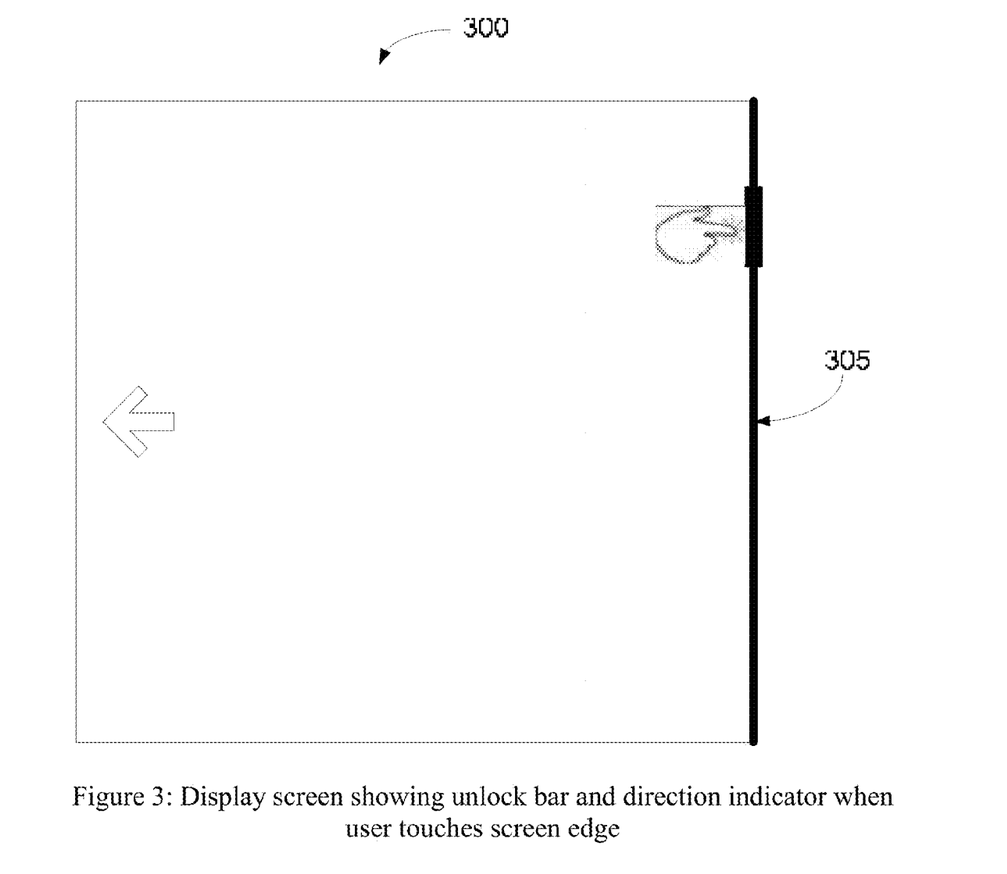
FIG. 3 is a depiction of a user touching the display screen on the right edge which causes an unlock bar to be displayed and a directional indicator to be displayed.

Once locked, a locked screen is shown such as a blank screen or the like shown as 200 in FIG. 2. In a basic embodiment, unlocking is carried out by the user touching the screen at a location within the unlock region of the screen. FIG. 2 shows two different unlock regions, a leftmost unlock region 205 and a rightmost unlock region 210. When the user touches the screen in any of those unlock regions, such as shown as 300 in the FIG. 3, this causes an unlock line 305 to appear at that location. The user can invoke and drag the unlock bar from the edge originally touched by the user's finger or pointing device to the opposite edge of the display screen at which point the display screen will display the image prior to the display screen being locked and the unlock method is complete.

In this embodiment, touching the screen 200 in the area 220 between the different unlock regions 205, 210 does not cause the unlock bar to appear.

Figure 4:
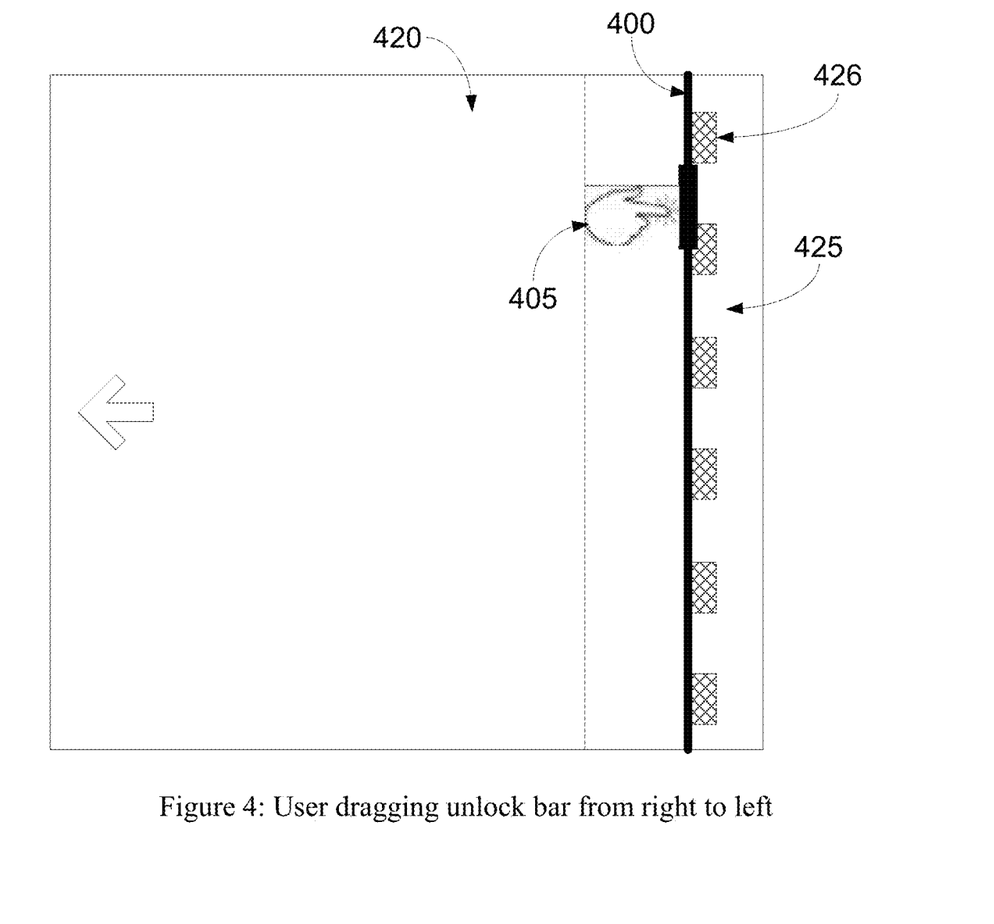
FIG. 4 shows the user dragging the unlock bar from right to left.

FIG. 4 shows the user dragging the unlock bar from the right towards the left. The unlock bar 400 is being dragged by the user's finger 405. As the unlock bar 400 is moved, it progressively changes from the locked part of the screen 422 the unlocked part of the screen 425. As the unlocked part of the screen 425 is revealed by moving the unlock bar across the screen, it shows the content such as the icons 426 below. That is, by moving the unlock bar across the screen, the content on the screen is progressively shown.

Once reaching an unlock location, the screen is automatically unlocked, allowing the content such as the icons 426 to be selected. That unlock location in this embodiment may require dragging all the way to the opposite edge of the screen. Alternatively, the user can drag the unlock bar 12 from the left towards the right.

Figure 5:
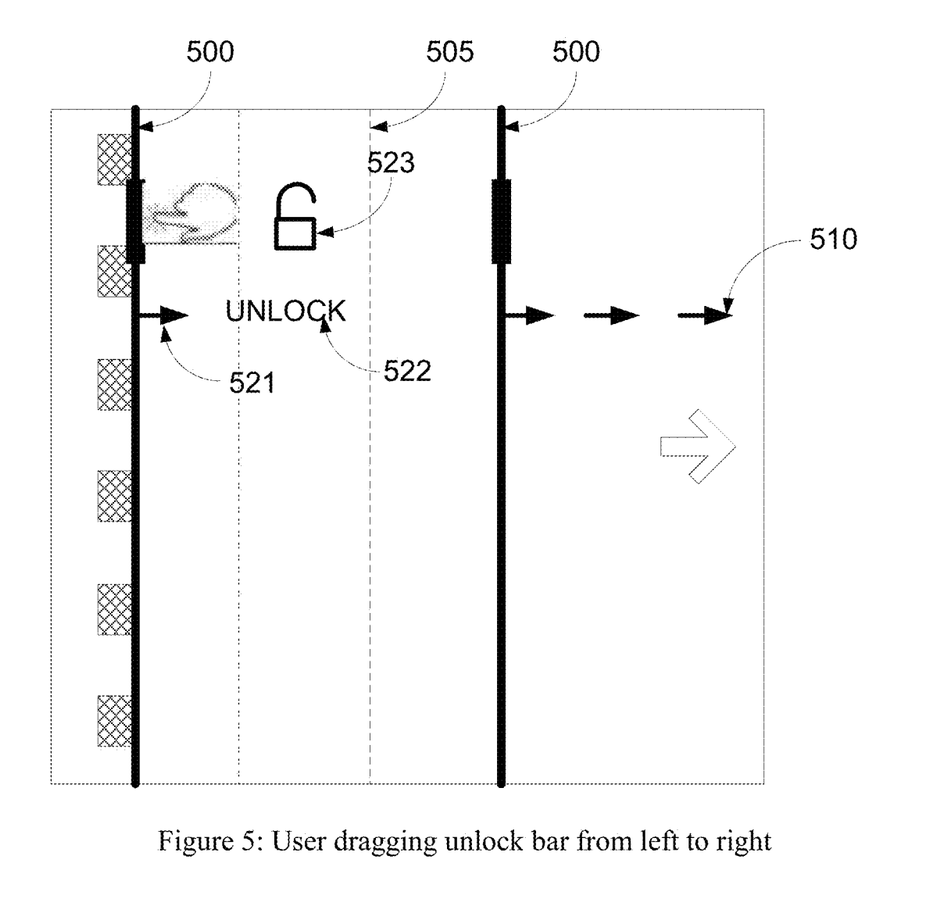
FIG. 5 shows the user dragging the unlock bar from left to right.

In another embodiment, shown in FIG. 5 once the user has invoked the unlock bar 500 and has dragged it a predetermined distance toward the opposite edge of the display screen to pass an unlock line 505 which may be shown or may simply be stored within the computer software, the remainder of the unlock continues automatically. In this embodiment, the user can remove their finger or pointing device after reaching the line 505, and the unlock bar 500 will thereafter continue as an animation (shown as 510) to the opposite edge of the display screen from where the user touched to invoke the unlock bar. At this time, the unlocking is complete and the screen unlocks. This embodiment in essence creates an animation of the unlock once the unlock region has been reached.

In another embodiment, once the user has invoked the unlock bar and has dragged it a predetermined distance toward the opposite edge of the display screen and the user removes her finger or pointing device the unlock bar and the remaining balance of the lock display overlay will be removed from the display screen at which time the unlock method is complete.

In another embodiment of the invention, a thickening of the unlock bar (See FIG. 3) will be present at the point where the user touched the display screen invoking the unlock bar.

In another embodiment, once the unlock bar has been invoked by the user, and there is a thickened portion or area of the unlock bar, and the user moves their finger or pointing device along the vertical axis of the unlock bar, the thickened portion will move such that the user's finger or pointing device remains in the center of the thickened portion.

In another embodiment, the unlock method will display a directional indicator such as an arrow 521 pointing to the opposite edge of the display screen from where the user touched to invoke the unlock bar.

In another embodiment, the directional indicator will be presented pointing to the opposite edge of the display screen and will be aligned on the vertical axis at the same point where the user's finger or pointing device is on the unlock bar.

In another embodiment, the directional indicator may also include text in addition to the directional indicator to inform the user of the purpose of the directional indicator. For example, the text associated with the directional indicator may display "Unlock", shown as 522. In another embodiment, the text associated with the directional indicator may be in a language previously selected by the user. In another embodiment, an icon may be substituted for the text. For example, an open padlock 523 may be substituted for the text or in addition to the text.

The unlock method can be invoked by the user regardless of vertical orientation of the display device. For example, a display may be in portrait for landscape mode. The unlock bar will always be displayed in the vertical axis as determined by the device being unlocked.

Figure 6:
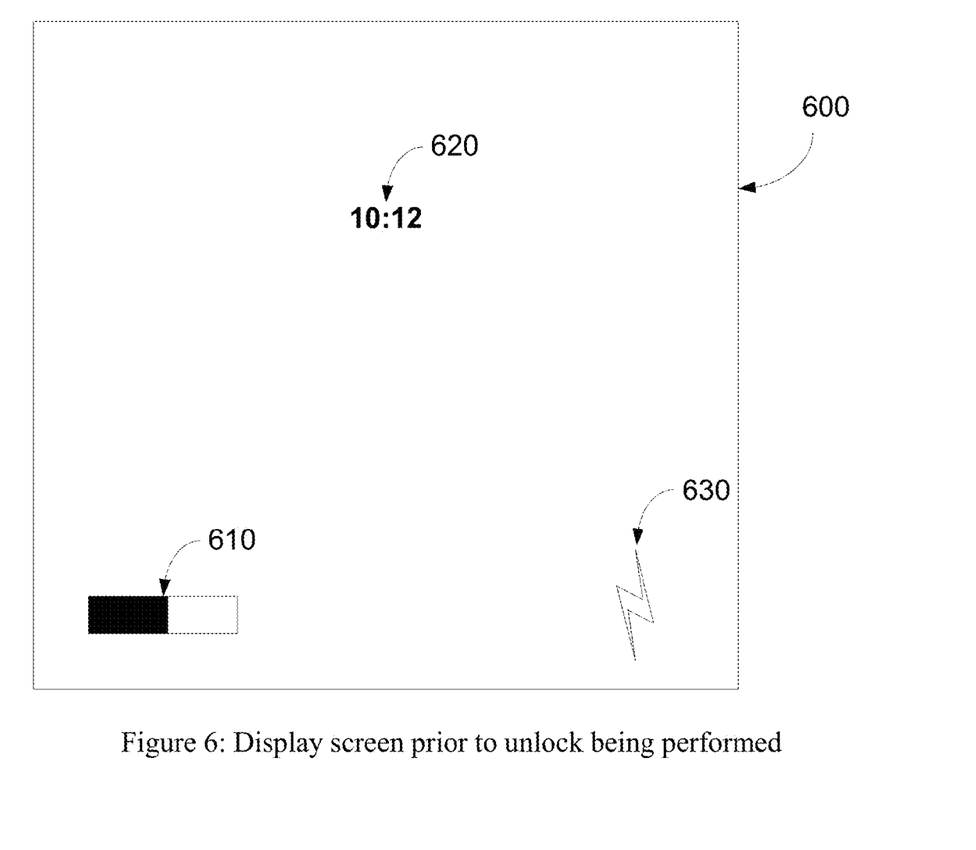
FIG. 6 shows the display screen prior to unlock being performed.
Figure 7:
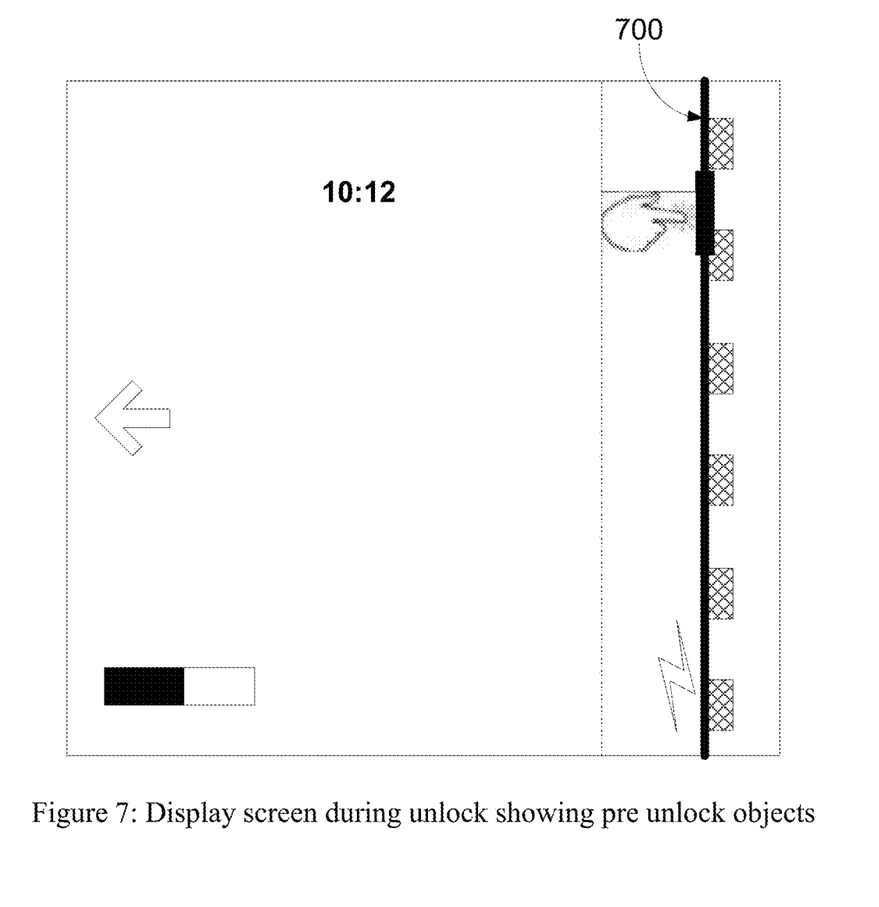
FIG. 7 shows the display screen during unlock showing pre unlock objects.

In another embodiment as illustrated in FIG. 6, the display screen 600 prior to being unlocked may display objects such as indications 610 of battery condition, current time 620, network connection status 630 and/or other informational objects. In this embodiment, the screen is locked, and any of the unlock embodiments described above may be used to unlock it. However, the locked screen still includes status information. FIG. 7 shows the display screen of this embodiment as the display screen is being unlocked. As the unlock bar 700 is moved, the status information items are progressively hidden and replaced by the screen contents such as those in FIG. 1.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of contents can be shown on the screen, and other forms and actions of unlocking can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer, running a program that shows a display screen, said display screen having an unlocked state, and having a locked state controlled by said program, wherein in the unlocked state, said display screen including content thereon which can be selected to run multiple programs respectively associated with said content that has been selected, and in the locked state, said display screen preventing said programs from being run and covering said content to prevent said programs from being selected, and said program running an unlocking program which includes detecting a user actuating a first location of the display screen, where said first location of the display screen is either within a first area that defines an unlock area on the display screen near a first end of the display screen, or is within a second area that defines another unlock area on the display screen that is near a second end of the display screen opposite from the first end of the display screen and responsive to detecting the user actuating the first location on the display screen, displaying an unlock bar adjacent to a location of actuating and extending across the display screen adjacent to the location of actuating, and allowing the user to move the unlock bar across the screen, wherein moving of the unlock bar causes said content to be revealed progressively as the bar is moved across the display screen, so that part of said content is revealed as said bar is moved across the screen, where said program causes said moving unlock bar to unlock from a first unlocked state by starting at said first area near a first end of the display screen and moving towards said second end of the display screen, and said program also causes said moving unlock bar to unlock from said first unlocked state by starting at said second area near said second end of the display screen and moving towards the first end of the display screen, and where prior to detecting the user actuating the first location of the display screen, the unlock bar is not displayed.

2. The computer as in claim 1, wherein said display screen is automatically unlocked when said unlock bar reaches a specified point, and when unlocked, said content can be selected.

3. The computer as in claim 2, wherein said specified point is on an opposite end of the display screen from the end that is selected.

4. The computer as in claim 2, wherein said specified point is a point on the display screen other than at an end of the display screen.

5. The computer as in claim 1, wherein said unlocking program which includes a moving unlock bar across an area of said display screen, where said moving causes said content to be revealed progressively as the bar is moved across the display screen, so that part of said content is revealed as said bar is moved across the display screen, wherein said computer automatically runs an animation routine once a point on the display screen is reached before an end of the display screen, said animation routine continuing to move the unlock bar across the display screen from said point on the display screen to the end of the display screen, said animation completing without user interaction.

6. The computer as in claim 5, wherein said unlock bar is only selectable at specified portions of the display screen, and at other portions of the display screen, the unlock bar is not selectable, wherein said portions of the display screen include first and second portions of the display screen which are on outer edges of the display screen.

7. The computer as in claim 1, where in the locked state, the computer does not block content on the display screen about computer operation from being seen, but does block selectable icons which can be selected to select programs on the display screen from being seen, so that said selectable icons are not seen from the display screen when blocked, but the content about computer operation from the display screen is seen when blocked.

8. The computer as in claim 7, wherein the content about the computer operation includes battery condition, current time, and network connection status, which are shown in the locked state in the same way they are shown in the unlocked state.

9. The computer as in claim 1, wherein the unlock bar includes a thin section, that is extended across the display screen while the user moves the unlock bar, and a second section that is thickened relative to said thin section, and said second section is present at a point where the user actuates the display screen.

10. The computer as in claim 1 wherein said computer automatically runs an animation routine once a point on the display screen is reached before an end of the display screen, said animation routine continuing to move the unlock bar across the display screen from said point on the display screen to the end of the display screen, said animation completing without user interaction.

11. A method of operating a computer, comprising:
operating the computer in an unlocked mode in which a display screen is shown and the display screen includes content thereon that can be selected to run a program associated with said content that has been selected;
operating the computer in a locked mode, in which said display screen blocks the content from being seen and prevents the content from being selected; and
when in the locked mode, detecting a user actuating a first location of the display screen, where said first location of the display screen is either within a first area that defines an unlock area on the display screen near a first end of the display screen, or is within a second area that defines another unlock area on the display screen that is near a second end of the display screen opposite from the first end of the display screen;
responsive to detecting the user actuating the first location on the display screen, displaying an unlock bar adjacent to a location of actuating and extending across the display screen adjacent to the location of actuating, and allowing the user to move the unlock bar across the display screen, wherein the moving of the unlock bar causes an unlocking program to unlock the computer by moving an unlock bar across an area of said display screen, where said moving causes said content to be revealed progressively as the bar is moved across the display screen, so that part of said content is revealed as said bar is moved across the display screen,
where said moving unlock bar unlocks from a first unlocked state by starting at said first end of the display screen and moving towards said second end of the display screen, and said moving unlock bar also unlocks from said first unlocked state by starting at said second end of the display screen and moving towards the first end of the display screen; and
prior to detecting the user actuating the first location of the display screen, the unlock bar is not displayed.

12. The method as in claim 11, wherein said display screen is automatically unlocked when said bar reaches a specified point, and when unlocked, said content can be selected.

13. The method as in claim 12, wherein said specified point is on an opposite end of the display screen from the end that is selected.

14. The method as in claim 12, wherein said specified point is a point on the display screen other than at an end of the display screen.

15. The method as in claim 14, further comprising automatically running an animation routine once said point on the display screen is reached, said animation routine continuing the moving the unlock bar across the display screen to an edge of the display screen, said animation completing without user interaction.

16. The method as in claim 11, wherein said unlock bar is only selectable at specified portions of the display screen, and at other portions of the display screen, the unlock bar is not selectable.

17. The method as in claim 16, wherein said portions of the display screen include first and second portions of the display screen which are on outer edges of the display screen.

18. The method as in claim 11, where in the locked mode, the computer does not block content on the display screen about computer operation from being seen, but does block selectable icons which can be selected to select programs on the display screen from being seen, so that said selectable icons are not seen from the display screen when blocked, but the content about computer operation from the display screen is seen when blocked.

19. The method as in claim 11, wherein said computer is a touchscreen computer, and said unlock bar is displayed adjacent to a location of touching by a user's finger, and said selecting comprises touching an icon on the display screen.

20. The method as in claim 11, wherein said computer is a touchscreen computer, and said moving comprises touching an area on the display screen and dragging to an opposite end of the display screen.

21. The computer as in claim 1, wherein said computer is a touchscreen computer, and said unlock bar is displayed adjacent to a location of touching by a user's finger, and said selecting comprises touching an icon on the display screen.

22. The method as in claim 11, wherein the unlock bar includes a thin section, that is extended across the display screen while the user moves the unlock bar, and a second section that is thickened relative to said thin section, and said second section is present at a point where the user actuates the display screen.

23. The method as in claim 11 wherein said computer automatically runs an animation routine once a point on the display screen is reached before an end of the display screen, said animation routine continuing to move the unlock bar across the display screen from said point on the display screen to the end of the display screen, said animation completing without user interaction.

24. A computer, running a program that shows a display screen, said display screen having an unlocked state, and having a locked state controlled by said program, wherein in the unlocked state, said display screen including content thereon which can be selected to run multiple programs respectively associated with said content that has been selected, and in the locked state, said display screen not allowing said programs to be selected and covering said content,
and said program running an unlocking program which includes detecting a user actuating a first location of the display screen, where said first location of the display screen is either within a first area that defines an unlock area on the display screen near a first end of the display screen, or is within a second area that defines another unlock area on the display screen that is near a second end of the display screen opposite from the first end of the display screen and responsive to detecting the user actuating the first location on the display screen, displaying a moving unlock bar adjacent to a location of actuating and extending across the display screen from one end of the display screen to another edge of the display screen, and adjacent to the location of actuating, and allowing the user to move the moving unlock bar across an area of said display screen, where said moving of the unlock bar causes said content to be revealed progressively as the bar is moved across the display screen, so that part of said content is revealed as said bar is moved across the display screen, where in the locked state, the computer does not block content about computer operation and displays the content about the computer operation from the display screen, but does block view of selectable icons from the display screen which can be selected to select said programs, so that said selectable icons are not seen from the display screen when blocked, but the content about computer operation is seen when blocked and where prior to detecting the user actuating the first location of the display screen, the unlock bar is not displayed.

25. The computer as in claim 24, where said moving unlock bar unlocks from a first unlocked state by starting at a first end of the display screen and moving towards a second end of the display screen, and also unlocks from said first unlocked by starting at said second end of the display screen and moving towards the first end of the display screen.

26. The computer as in claim 24, wherein the content about the computer operation includes battery condition, current time, and network connection status, shown in the locked state in the same that is shown in the unlocked state.

27. The computer as in claim 24, wherein said computer automatically runs an animation routine once a point on the display screen is reached, said animation routine completing moving the unlock bar across the display screen to an edge of the display screen, said animation completing without user interaction.

28. The computer as in claim 24, wherein said unlock bar has a first thickness when not touched and has a second thickness when the unlock bar is touched.

29. The computer as in claim 24, wherein the unlock bar includes a thin section, that is extended across the display screen while the user moves the unlock bar, and a second section that is thickened relative to said thin section, and said second section is present at a point where the user actuates the display screen.

30. The computer as in claim 24 wherein said computer automatically runs an animation routine once a point on the display screen is reached before an end of the display screen, said animation routine continuing to move the unlock bar across the display screen from said point on the display screen to the end of the display screen, said animation completing without user interaction.

* * * * *